UNITED STATES PATENT OFFICE.

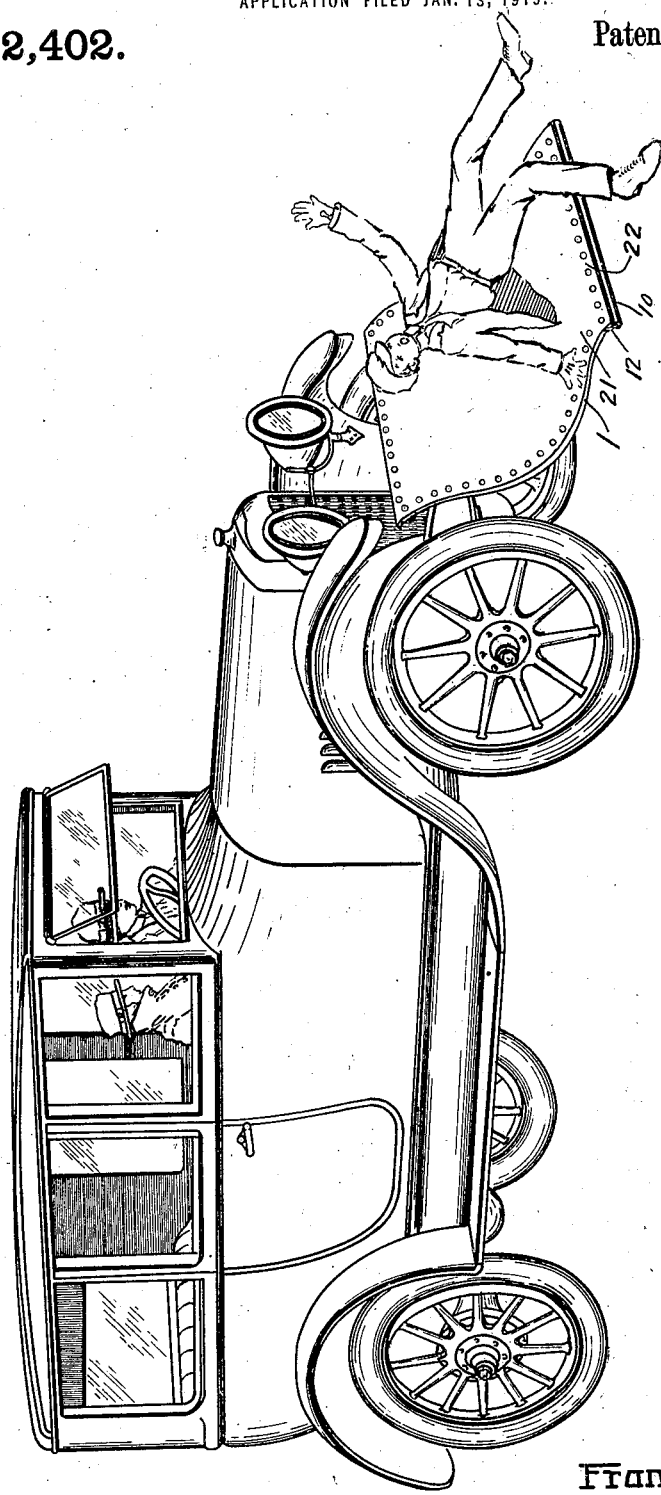

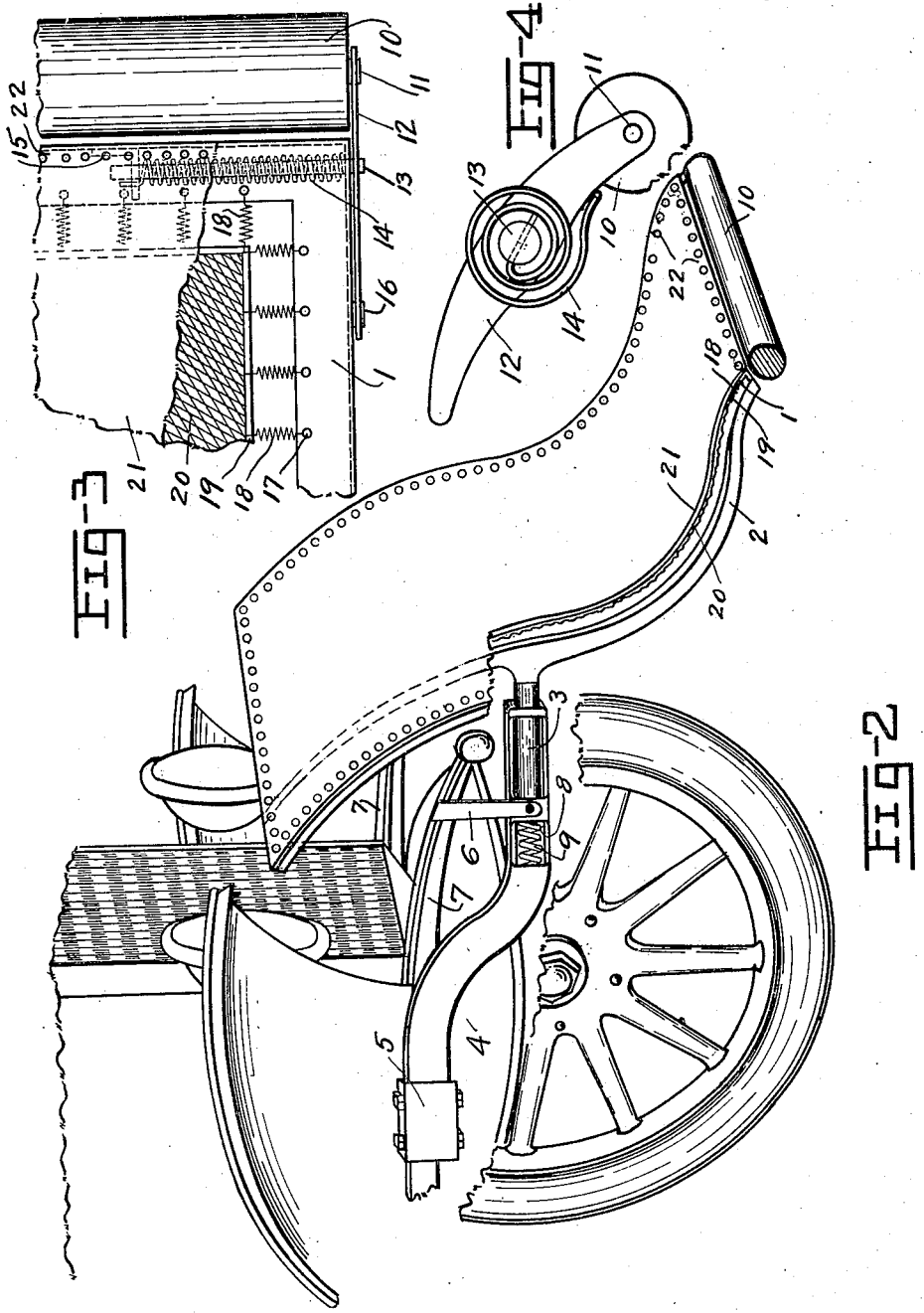

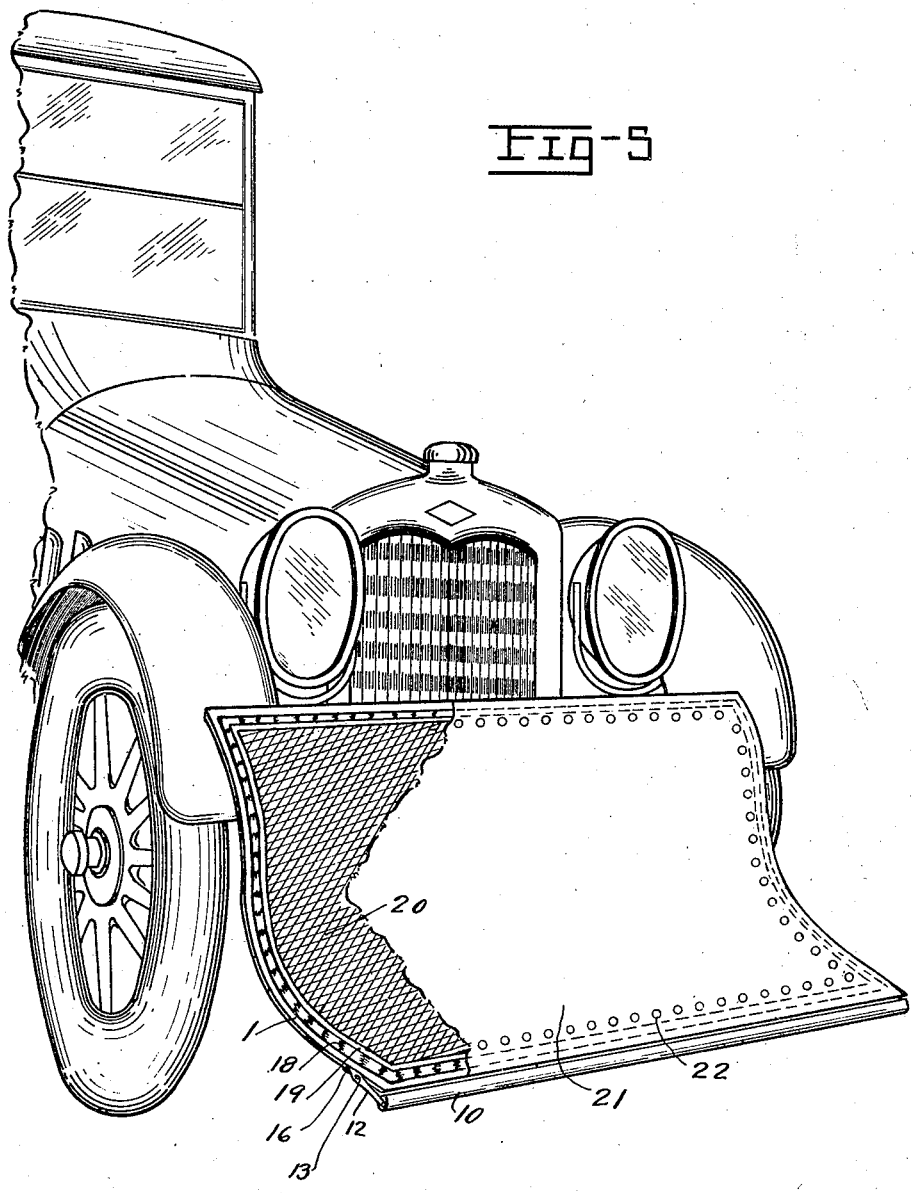

FRANK M. McDONALD, OF SEATTLE, WASHINGTON.

FENDER.

1,342,402.   Specification of Letters Patent.   Patented June 1, 1920.

Application filed January 13, 1919. Serial No. 270,881.

*To all whom it may concern:*

Be it known that I, FRANK M. McDONALD, a citizen of the United States, residing at Seattle, in the county of King and State of Washington, have invented certain new and useful Improvements in Fenders, of which the following is a specification.

The invention relates to that class of appliances carried by automobiles, locomotives, electric cars and the like, and is adapted to prevent serious results from collisions with pedestrians, etc. One of the objects is to provide a simple apparatus that can be readily applied, and will to a material degree eliminate the danger of injuring persons struck.

In the accompanying drawings:

Figure 1 is a perspective view of an automobile, showing the improved fender in place.

Fig. 2 is a detail view on an enlarged scale of the front portion of the automobile, with parts broken away, to illustrate the detailed construction.

Fig 3 is a plan view of a portion of the fender, with the covering sheet broken away.

Fig. 4 is a detail view in elevation of the roller and one of its supports.

Fig. 5 is a perspective view of the front portion of an automobile with the fender in place thereon and a part of said fender broken away to illustrate the supporting fabric.

Similar reference numerals designate corresponding parts in all the figures of the drawings.

In the embodiment disclosed, a main frame 1 is employed that is preferably rectangular in shape, but having a substantially ogee curve. This frame is mounted on bracket arms 2 having rearward extensions 3. These extensions are slidably mounted in guideways 8 of supporting arms 4. The supporting arms are secured to the vehicle by clips 5 and depending brackets 6, the latter being preferably carried by the frame portion 7 of the automobile or other vehicle. The extensions 3 are borne against by coiled springs 9 placed in the guideways 8 behind said extensions, thereby serving to yieldingly maintain the structure in projected relation.

Upon the lower front end of the frame is mounted a roller 10 preferably of rubber or soft yielding material. This roller is provided with terminal pintles 11 journaled in arms 12 that are pivotally mounted, as shown at 13, on the lower end of the frame. Springs 14 surround the pivots 13, and have bearings against the arms to normally hold the roller elevated, but permit its depression. The pivots 13 are each engaged at their outer ends in the side bars of the frame 1 and their inner ends are carried by brackets 15 secured to the lower end bar of the frame. The elevation of the roller 10 by the springs 14 is limited by stop lugs 16 carried by the frame 1, and located in the path of the rear ends of the arms 12.

Arranged within the frame is a fabric 20, preferably of woven wire, and having a marginal frame 19 to which are secured springs 18 that are fastened to the main frame 1, as shown at 17. This fabric wall is covered by a facing sheet 21, preferably of rubber or flexible material secured to the main frame 1, as illustrated at 22.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim as new, and desire to secure by Letters Patent, is:—

1. In apparatus of the character set forth, the combination with a main frame, of means for supporting the same on a vehicle, a yielding wall carried by the main frame, arms pivoted between their ends on the lower end of the main frame, springs on the pivots of said arms operating against the arms, stops carried by the main frame for limiting the swinging movement of the arms, and a yielding roller journaled on the arms and extending across the main frame in advance of the same.

2. In apparatus of the character set forth, the combination with a main frame, of means for supporting the same on a vehicle, an open fabric within the main frame, springs for securing the fabric in taut condition within the main frame, and a yielding wall covering the open fabric and permanently secured at its opposite margins to the main frame, forming a receiving wall that is reinforced by the open fabric.

3. In apparatus of the character set forth, the combination with supporting arms, of means for securing the same to a vehicle, said supporting arms having guideways in their front ends, an oppositely curved main frame, brackets carried by the main frame and having rearward extensions slidably mounted in the guideways, springs in said guideways operating on the extensions to project the same, an open fabric within the main frame, springs connecting the fabric to the main frame, a wall of yielding material secured to said main frame and extending over the fabric, arms pivoted between their ends to the main frame and extending in front of the same, a yielding roller journaled on the arms and extending across the main frame in advance of the same, springs operating against the arms to yieldingly support the roller, and means for limiting the swinging movement of the arms.

FRANK M. McDONALD.